J. D. LATHROP,

Assignor, by mesne assignments, to himself and A. P. SUTPHEN.

Milk-Pail.

No. 8,533. Reissued Jan. 7, 1879.

Witnesses
John Becker
Fred Naymer

Inventor
John D. Lathrop
by his Attorneys
Brown & Brown

N. PETERS, PHOTO-LITHOGRAPHER, WASHINGTON, D. C.

UNITED STATES PATENT OFFICE.

JOHN D. LATHROP, OF SOMERVILLE, N. J., ASSIGNOR, BY MESNE ASSIGNMENTS, TO HIMSELF AND ARTHUR P. SUTPHEN, OF SAME PLACE.

IMPROVEMENT IN MILK-PAILS.

Specification forming part of Letters Patent No. 195,138, dated September 11, 1877; Reissue No. 8,533, dated January 7, 1879; application filed November 13, 1878.

DIVISION B.

*To all whom it may concern:*

Be it known that I, JOHN D. LATHROP, of Somerville, in the county of Somerset and State of New Jersey, have invented certain new and useful Improvements in Combined Milking Pail and Stool, which improvements are fully set forth in the following specification, reference being had to the accompanying drawing.

My invention relates to a milking-pail so constructed and arranged as to serve the double purpose of a receptacle for the milk and of a stool or seat for the accommodation of the person employed in the operation of milking.

The invention consists in certain novel means for attaching a receiver to a milking-pail to provide for the adjustment of said receiver, and for freedom of the receiver to swing horizontally, as hereinater described.

The invention further consists in forming the said pail with a flanged top and bottom, combined with vertical braces or supports, which mode of construction greatly strengthens the same, and thereby renders it better adapted to serve the purpose of a stool or seat for the person milking.

Figure 1:
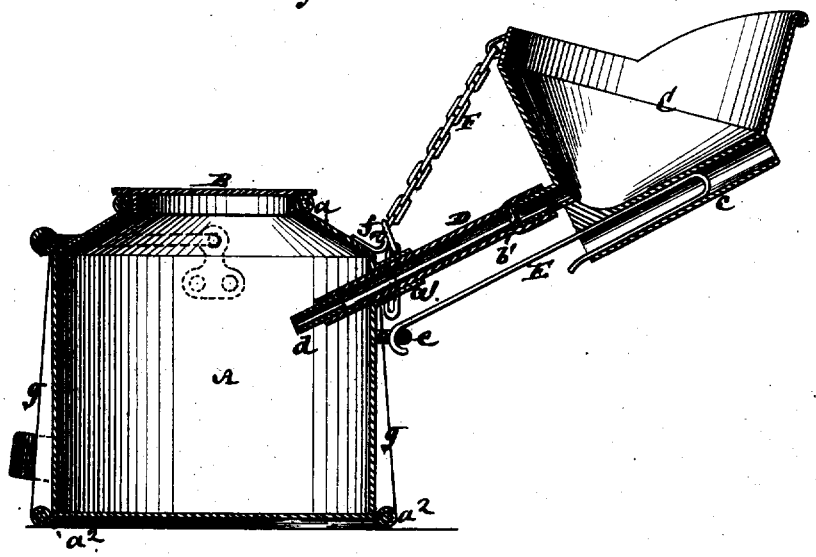
Figure 2:
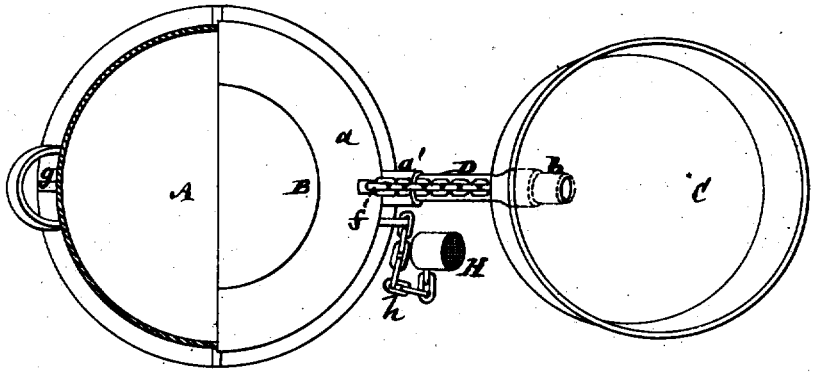

In the accompanying drawing, Figure 1 is a vertical transverse section of my combined milking pail and stool; and Fig. 2 is a plan view of the same, one-half the pail being represented in section.

The pail A may be constructed of tin-plate or other suitable material, and is preferably cylindrical in form. The pail represented has its bottom formed with a flange, $a^2$, projecting downward and outward, and stiffened by means of a wire or otherwise, in any suitable manner. Its top is also formed with a flange, $a$, projecting angularly upward and inward, leaving a circular opening of considerable size in the center, into which is fitted the removable cover B. To the exterior of the pail A is secured a series of vertical braces or supports, $g$ $g$, which are also firmly attached, by soldering or otherwise, to the flanged bottom $a^2$, as shown in Fig. 1. The arched form thus given the top and bottom of the pail, in combination with the vertical braces, gives great strength and stiffness to the pail without adding materially to its weight or bulk, and thus better adapts it to its purpose as a stool or seat for the person milking.

The milk-receiver C in its general form resembles a funnel placed in an inclined position. Its construction differs from that of an ordinary funnel in the following respects: The axis of the discharging tube or spout $b$, instead of being coincident with the axis of the conical portion of the receiver, forms a considerable angle therewith, and is parallel, or very nearly so, with the lower side of the receiver. At the larger end of the receiver the lower side thereof is extended considerably beyond the upper side, so as to form a projecting lip. Both of these features are clearly shown in Fig. 1. The converging sides of the receiver C are preferably so constructed as to subtend an angle of not more than ninety degrees.

When the receiver C is constructed in the peculiar form which I have described, it is capable of being adjusted in an inclined position by means of devices hereinafter to be described, so that a stream of milk from the cow may be directed into its open end either vertically, horizontally, or at any intermediate angle, without deflecting or spattering, in such a direction that any portion thereof will fall outside the receiver, while at the same time the milk will flow freely down the inclined tube $b$ into the tube D, and thence into the pail A as fast as it enters the receiver.

In order that the apparatus may be used conveniently with animals of different sizes, it is essential that the milk-receiver should be capable of being adjusted and secured at any required height above the pail, while at the same time it must be connected with the pail in such manner that it will not be liable to injury or disarrangement from the kicks of vicious or unruly animals. In order to provide for this adjustment, the receiver is connected with the pail by means of a flexible tube, and is supported by means of a device which admits of convenient and ready adjustment. These features of my invention I will now describe.

The inclined conductor or spout $b$, which is attached to the receiver C, is inserted within the upper end of a flexible elastic tube, D, preferably of india-rubber or other equivalent material, which is retained in its position by its own elasticity.

The lower end of the tube D is introduced into the pail A through a short inclined spout or inlet-tube, $a^1$, which projects angularly upward from the side of the pail, just beneath the upper flange, *a*, and in such a position as to be supported and strengthened by use of the braces *g g*, extending upward from the bottom flange, which abuts against it, as seen in Fig. 1.

The flexible tube D is of such diameter as to slide freely in and out within the inclined tube or spout $a^1$, so as to admit of the height of the receiver being varied at pleasure.

A metal thimble, provided with or forming a strainer, *d*, is inserted into the loose end or outlet of the tube D, and is firmly held in its position by the elasticity of the said tube. Another similar strainer, *b'*, is attached to the end of the spout or conductor *b* at the inlet of the tube D, and thus the milk is strained as it pours into the flexible tube, and again as it passes out of the tube into the pail A, thereby more effectually separating from it any particles of foreign matter that may have accidentally found their way into the receiver. Either one of these two strainers may be dispensed with in cases where a single strainer is found to be sufficient.

The receiver C is supported by a stout wire, E, the lower end of which is bent into a hook, and inserted into an eye, *e*, which latter is attached to the outside of the pail A, just beneath the spout $a^1$.

The upper end of the wire E is bent round parallel to itself in the form of an elongated hook, which hook is inserted into a tubular socket, *c*, formed on the outside of the inclined bottom of the receiver C in such a manner that the receiver will slide freely up and down upon the bent wire E, while the latter, when bent in the form shown, has sufficient elasticity to retain the receiver C in any position in which it may be placed.

The chain F, which is attached to the rim of the receiver, acts, in conjunction with the wire or support E, to hold the receiver C in any required position, and is likewise adjustable as to its length, as a link at any point may be attached to a hook, *f*, upon the pail.

It may be preferable in some cases to make use of a snap or spring hook or clasp at *f*, instead of the simple hook which I have shown in the figures. Any device which will grasp and hold the chain firmly at any required point in its length will serve the same purpose.

Thus it will be seen that the height of the receiver C above the pail A may be conveniently adjusted at any time simply by unfastening the chain F at *f*, and sliding the receiver up and down upon the wire E, the flexible tube D at the same time sliding within the inlet-tube $a^1$.

The angle of inclination of the receiver C may be adjusted by means of the chain F in the same manner.

It will also be readily understood that the connection of the receiver C with the pail by means of the hook and eye *e*, the chain *f*, and the flexible tube D is such as to admit of a free motion of the receiver in either direction horizontally, so that in case it is struck or kicked by an unruly animal it will yield to the blow without sustaining any injury, and immediately afterward return to its normal position.

I have provided a separate strainer, H, made to fit the spout or nozzle $a^1$, and attached to the pail A by a short chain, *h*, which may be placed upon the said spout after the receiver C and its attachments have been removed, and before pouring the milk from the pail A into another vessel, whereby the milk is strained a second or third time before being used, which will, in many cases, be found advantageous. When this is done the flange *a* serves to prevent the milk from being spilled over the top of the pail.

It will be observed that all the parts of the apparatus are so constructed as to be easily separable from each other, for the purpose of washing or cleansing.

It will also be seen that when the receiver and its attachments are removed, the pail A, owing to its peculiar form, may be conveniently used as a batter-pail or water-pail, or, by attaching a rose, as a sprinkling-pail.

I claim as my invention—

1. The receiver C, flexible and elastic tube D, and support E, so attached to the pail A as to admit of a horizontal swinging motion, substantially as and for the purpose specified.

2. The pail A, provided with flanges at the top and bottom, and with the vertical supports or braces *g g*, substantially as and for the purpose specified.

JOHN D. LATHROP.

Witnesses:

HENRY T. BROWN,
OWEN PRENTISS.